Patented June 4, 1946

2,401,348

UNITED STATES PATENT OFFICE 2,401,348

MOLDING COMPOSITION, MOLDED PRODUCT, AND METHOD OF MAKING

Ernst A. Hauser and Eli Mercer Dannenberg, Cambridge, Mass., assignors to Research Corporation, New York, N. Y., a corporation of New York No Drawing. Application March 17, 1942,
Serial No. 435,106

15 Claims. (Cl. 260—41)

This invention relates to a composition for molding, the method of preparing the composition, and molded products thereof.

An object of the invention is to produce a molding composition and molded products composed of a solid in powder, granular or fibrous form and a polymerizable or polymerized organic material, said solid and said organic material being so combined that the internal structure of the molded products is, or may be, free or substantially free of interfacial polarization commonly encountered when an electrical potential is applied to molded bodies made of a heterogeneous mixture of a binder, such as a natural or synthetic resinous material and a finely divided filler which do not ion exchange or otherwise chemically combine. The invention is based upon the concept of using as the molding composition a powdered, granular or fibrous solid to which a polymerizable material has been attached or combined by ion exchange. A second object of the invention is to produce molded bodies resistant to relatively high temperatures.

It will be apparent upon consideration of the following disclosure that the invention has numerous embodiments, some of which will be described in detail hereinafter by way of illustration.

A better understanding of the foregoing general statements may be obtained by considering a specific composition of the invention, such as a composition of a clay having base exchange properties, e. g. sodium bentonite, and a salt of a polymerizable olefinic carboxylic acid, e. g. lead acrylate. The sodium bentonite may be treated with a solution of the lead acrylate so as to substitute a complex lead acrylate cation for the sodium ion of the bentonite by base exchange and the resulting bentonite-lead acrylate molecule polymerized to yield a product having excellent electrical and mechanical properties which render it suitable for use as an insulating material or body. It appears that, in addition to the lead acrylate ion which is introduced into and chemically combined with the bentonite by base exchange, additional lead acrylate may be simply adsorbed and/or absorbed on the bentonite particles, and that in the polymerization this additional lead acrylate becomes chemically combined by polymerization of its acrylic group with those bonded to the bentonite. Whether or not free lead acrylate is present in the molding mixture, it will be seen that the polymerization results in a homogeneous giant molecule containing the bentonite particles, the lead and the acrylate groups, all chemically combined and free of interfacial polarization.

In speaking of a chemical bonding of the polymerizable olefinic carboxylic acid compound to the ion-exchange solid, we have in mind a chemical bonding which may be different in kind or in degree from the chemical bond existing between e. g. sodium and chlorine in sodium chloride but which, on the other hand, is something more than the mere mechanical bond, without ion exchange, between the constituents of a simple mixture such as heterogeneous systems of organic plastics and fillers, e. g. mixtures of asbestos or cellulose fibers, mica or quartz particles or the like with Bakelite, acrylic resins or the like.

The differences resulting from such chemical bonding as compared with simple mechanical mixture can best be illustrated by comparing data on power factors obtained with molded test pieces made in accordance with this invention composed of e. g. 50% lead clay (described below) and 50% lead acrylate (sample I), a mechanical mixture of non-base exchanging ground mica (50%) and lead acrylate 50% (sample II) and a mixture of 50% ground quartz and 50% lead acrylate (sample III).

| | Measuring temp. at— | Sample I | Sample II | Sample III |
|---|---|---|---|---|
| | °C. | | | |
| Power factor, percent, 60 cycles, as received | 25 | 1.3 | 5.6 | 4.9 |
| | 100 | 2.6 | 18 | 21 |
| Power factor, percent, 60 cycles, after 48 hrs. conditioning, at 85% R. H. | 25 | 1.4 | 9.2 | 8.6 |
| | 100 | 4.2 | 68 | 76 |
| Power factor, percent, 60 cycles, after 48 hrs. at 100° C | 25 | 1.2 | 4.1 | 4.9 |
| | 100 | 1.9 | .11 | 13 |

Electrical measurement made with 1″ diam. Aquadag electrodes. Samples 1½″ diam. approx. 100 mils thick.
Samples molded 5 min. 200° C. 10,000 lbs./in.²

It is evident from the above data that the chemical bonding in the case of sample I eliminates interfacial polarization, typical for the mechanical mixtures. The absence of interfacial polarization is responsible for the low power factor as compared with those obtained with samples II and III.

The invention embraces compositions of a solid to which polymerizable organic material is attached by an ion exchange type of chemical bond and does not exclude the presence of either solid material not so combined or polymerizable organic material not so combined, that is, it does not exclude the presence of either an excess of the ion exchange solid or an excess of the salt of the polymerizable organic material over and above that which is combined by ion exchange.

It is to be understood that the invention embraces all sorts of solid base exchange materials including organic, inorganic and mixed organic-inorganic materials. In this connection attention is called to the current literature in which materials which exhibit the type of chemical bond referred to above are referred to as ion exchange-adsorbent materials.

Specific examples of base exchange solids which come into consideration in the present invention are natural and synthetic base exchanging materials such as bentonite, zeolites, very finely ground kaolinite and phenol formaldehyde resin capable of cation exchange.

When using base exchange solids which are hydrous silicates or hydrous aluminum or magnesium silicates of the type of sodium bentonite and contain structural water and tend to hydrate and swell when in contact with water, it is desirable to employ a salt of the polymerizable olefinic carboxylic acid which will replace the sodium by a cation which will reduce or preferably eliminate the water swelling properties of the solid. Thus by treating such base exchange solids with a salt of a polymerizable olefinic carboxylic acid such as lead acrylate there is obtained a product which, upon being molded and heated to effect polymerization, has excellent properties with respect to low moisture pick-up and resistance to deterioration when brought into contact with water.

The actual mechanism of the reaction between the base exchange solid and the polymerizable olefinic carboxylic acid compound is not definitely known but it appears probable, using lead acrylate and sodium bentonite for illustration, that in concentrated solutions we may consider the base exchange as having occurred between the exchangeable sodium of the bentonite and the complex

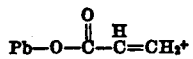

ions. The net result is two-fold; first the bentonite particles are rendered non-swelling in water due to the replacement, on the surface planes, of the Na+ ions which have a small ionic radius by

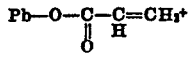

ions having a much larger ionic radius, and second, the edges and corners of the bentonite particles are coated by base exchanged lead acrylate ions. The lead acrylate ions besides being held to the surfaces also get in between the unit crystal sheets constituting a bentonite particle so that upon polymerization of these acrylate groups the originally open textured bentonite particle becomes filled and firmly bonded together by true chemical bonds. The lead acrylate ions which are held on the surfaces of the individual bentonite particles serve to chemically bond such particles together. The product has the properties of a thermo-setting or heat hardenable plastic.

In actual practice all that is necessary to be done is to mix the sodium bentonite with a solution (preferably concentrated) of lead acrylate, dry the mixture, grind the resulting clumpy mass to a fineness suitable for molding, as by ball milling it, subject the resulting powder to pressure molding and heat the molded mass to effect polymerization of the acrylate group. This simple procedure, however, has the drawback that the sodium ion which is replaced from the bentonite by the base exchange reaction is retained in the molding mixture probably as sodium acrylate. Since sodium is highly hydratable its presence reduces the water resistance of the product. The sodium ion may be separated in several ways, such as by first treating the bentonite with a solution of a salt of a less hydratable cation, such as Mg, or Pb, e. g. lead nitrate and washing the treated bentonite free of the resulting sodium nitrate and excess lead nitrate and then treating it with lead acrylate. Or the sodium bentonite may be treated with lead acrylate solution, separated and washed to remove the sodium acrylate formed by the base exchange, more lead acrylate added to the washed bentonite and the resulting mixture dried, ground and molded as described above.

In place of lead acrylate used above in illustrating the treatment of bentonite, we may use the salts of metals such as Ba, Sr, etc., or ammonia as substituted ammonia salts (ethylene diamine diacrylate) i. e. salts which have cations of a low degree of hydration and an ionic diameter of at least about 2.6 Angstrom units, with polymerizable olefinic carboxylic acids such as those of acrylic, methacrylic, vinyl acetic, crotonic, phenyl acrylic and substituted acids of this type, etc. In treating other base exchange solids any polymerizable compound which may be base exchanged with the base exchange solid material may be employed. With base exchange solids other than bentonite the size of the cation of the base exchange salt may or may not come into consideration but cations of low hydration are preferred for yielding products having good water resistance properties.

In the treatment of the sodium bentonite as described above it may be either in dry form or in the form of a suspension in water at the time of application of the base exchange salt. When a bentonite suspension or gel is treated with e. g. lead nitrate it flocculates and the resulting material may be washed with water and then treated with e. g. lead acrylate solution.

For the specific case of first treating a Na clay with Pb(NO$_3$)$_2$ to form Pb clay, and then adding lead acrylate to form lead acrylate complex exchanged bentonite, the following mechanism is suggested: If Na-bentonite is added to a concentrated solution of lead nitrate one finds by measuring the decrease in concentration of the lead nitrate solution, that the clay has exchanged 240 m. e. (milliequivalent) of Pb/100 g. of Na-clay. If one now washes the clay until the wash liquor gives no test for Pb with K$_2$CrO$_4$, and analytically determines the quantity of Pb retained by the clay, one finds that this corresponds to a base exchange capacity of 110 m. e. of Pb/100 g. of the original Na-clay. It is evident that the base exchange reaction is very dependent upon concentration. The equations which are presumed to account for these facts are as follows:

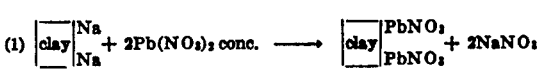

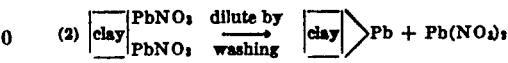

In this manner a Pb-clay is formed having its base exchange capacity fully saturated with divalent Pb ions.

If now a concentrated solution of lead acrylate is added to such Pb-clay, a reaction, the reverse of type 2 above, occurs. That is:

(3)
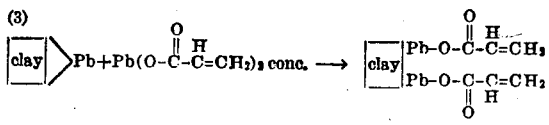

and the lead content of the clay is increased again to 240 m. e./100 g.

In actual practice all one has to do is add the Pb-clay to a Pb-acrylate solution. When this mixture is dried down the lead acrylate concentration is built up to such an extent that reaction (3) proceeds automatically. Upon polymerization of the base exchanged lead acrylate complex ions attached to one particle with those associated with other particles a giant molecule can be built up due to the true chemical bond or bridging which now exists between these clay particles.

It has been found that too small a ratio of lead acrylate to bentonite in the molding mixture, e. g. less than 30%, tends to give molded products which exhibit some interfacial polarization effect. On the other hand, when the ratio of lead acrylate to bentonite is too high, e. g. above 60% or 70%, the molded body is likely to show tracking when subjected to high electrical potential for testing its insulating or dielectric properties. A ratio of lead acrylate to bentonite of about 30% to 40% has been found to be most satisfactory from the standpoint of a product which has the optimum properties with respect to interfacial polarization on one hand and tracking on the other.

It will be seen that it is possible to provide a great variety of combinations of the base exchange solid and the polymerizable olefinic carboxylic acid compounds. For example, the sodium bentonite may be base exchanged with any cation of low hydration preferably of an ionic diameter of at least about 2.6 Angstrom units, such as lead, barium, ammonia, etc., and then treated with the same or another salt of the polymerizable olefinic carboxylic acid. Specifically, lead bentonite may be treated with lead acrylate or with barium acrylate or barium bentonite may be treated with barium acrylate or with lead acrylate, etc.

In the case of base exchange solids like sodium bentonite or hydrogen bentonite, the cation of the salt should, as stated, be capable of rendering the hydrous oxide non-swelling. In the case of other base exchange materials, it need be only a non-hydrating ion. The polymerization product must be insoluble and hydrophobic if the molded article is to be a good insulator. It appears that salts of multivalent cations capable of giving complex ions of the type of $$Pb-O-C-CH=CH_2^+$$
$$\parallel$$
$$O$$

are in general most satisfactory.

Examples

I. 200 g. of Wyoming bentonite (consisting primarily of the clay mineral montmorillonite) was dispersed in 2000 g. of a water solution of 10% by weight of lead acrylate. This mixture was then placed in flat pans and dried in an oven at 100° C. for 24 hours. The dried material was then ground in a ball mill for 8 hours and the powder obtained was used for compression molding. The molding pressure used was 10,000 lbs./in.², the temperature was 210° C.; and the time in the mold was 5 minutes. Various shaped articles were thus produced.

II. 200 g. of Wyoming bentonite was dispersed in 2000 cc. of a 10% by weight solution of lead nitrate in order to replace with lead all of the base-exchangeable ions present in the naturally occurring bentonite. The mixture was then diluted down to 10 liters and the clay allowed to settle out. The supernatant liquid was decanted and the slurry was again diluted to 10 liters and the process repeated ten times. The purpose of this procedure was to remove all the excess lead nitrate present.

To the slurry obtained after this final decantation was added 2000 g. of a 10% by weight solution of lead acrylate in water. This mixture was then placed in flat pans and dried in an oven at 110° C. for 24 hours. Further processing is identical with that described in Example I.

III. The process of Example II was repeated with the substitution of an equal amount by weight of barium acrylate for lead acrylate.

IV. The process of Example II was repeated with the substitution of an equal amount by weight of calcium acrylate for lead acrylate.

V. The process of Example II was repeated with the substitution of an equal amount by weight of the salt of ethylene diamine and acrylic acid for lead acrylate.

VI. 200 g. of green sand (natural zeolite) was added to 2000 g. of a 10% by weight solution of lead acrylate in water and the resulting mixture ball milled for 12 hours. After ball milling the mixture was placed in flat pans and dried for 12 hours at 110° C. The dried material was ball milled again and the powder obtained was compression molded. A black, glass-like material was obtained using a molding pressure of 10,000 lbs./in.², a temperature of 200° C. and a time of 15 minutes.

VII. The process of Example I was repeated with the substitution of an equal amount of Fuller's earth for Wyoming bentonite.

VIII. 200 g. of a modified phenol-formaldehyde resin especially prepared to act as a cation exchanger (commercial-product) was added to 2000 g. of a 10% by weight solution of lead acrylate in water and the resulting mixture ball milled for 12 hours. After ball milling the mixture was placed in flat pans and dried for 12 hours at 110° C. The dried material was ball milled again and the powder obtained was compression molded. The molding pressure used was 2000 lbs./in.²; the temperature, 160° C.; and the time 5 minutes.

We claim:

1. A molding composition comprising the finely sub-divided ion exchange compound of from about 30 to about 70 parts by weight of a base exchange finely divided solid and from about 70 to about 30 parts by weight of an ionizable salt of a polymerizable olefinic carboxylic acid, said compound containing the polymerizable olefinic group of said salt.

2. A composition as defined in claim 1 in which the base exchange solid is a bentonite.

3. A composition as defined in claim 1 in which the base exchange solid is sodium bentonite.

4. A composition as defined in claim 1 in which the base exchange solid is a phenol-formaldehyde resin.

5. A composition as defined in claim 1 in which the base exchange solid is a zeolite.

6. A composition as defined in claim 1 in which the salt is a salt of acrylic acid.

7. A composition as defined in claim 1 in which the salt is an amine salt.

8. A composition as defined in claim 1 in which the salt is lead acrylate.

9. A composition as defined in claim 1 in which the salt is an alkaline earth metal salt.

10. A composition as defined in claim 1 in which the salt is a barium salt.

11. A composition as defined in claim 1 in which the salt is a salt of a polyvalent metal.

12. A composition as defined in claim 1 in which the salt is a salt of a metal the ion of which is less hydrated than the sodium ion.

13. A composition as defined in claim 1 in which the base exchange solid is a bentonite and the salt is lead acrylate.

14. A composition as defined in claim 1 in which the compound is polymerized.

15. A composition as defined in claim 1 in which the compound is polymerized and molded.

ERNST A. HAUSER.
ELI MERCER DANNENBERG.